(12) United States Patent
Donovan et al.

(10) Patent No.: US 7,328,437 B2
(45) Date of Patent: Feb. 5, 2008

(54) MANAGEMENT OF LOCKS IN A VIRTUAL MACHINE ENVIRONMENT

(75) Inventors: Michael J. Donovan, Endicott, NY (US); Melissa K. Howland, Endicott, NY (US); Steven Shultz, Endicott, NY (US); Xenia Tkatschow, Jamesville, NY (US)

(73) Assignee: International Business Machines Corporation, Armonk, NY (US)

( * ) Notice: Subject to any disclaimer, the term of this patent is extended or adjusted under 35 U.S.C. 154(b) by 989 days.

(21) Appl. No.: 10/425,468

(22) Filed: Apr. 29, 2003

(65) Prior Publication Data

US 2004/0230972 A1 Nov. 18, 2004

Related U.S. Application Data

(62) Division of application No. 10/280,987, filed on Oct. 24, 2002, now Pat. No. 7,181,744.

(51) Int. Cl.
*G06F 9/455* (2006.01)
*G06F 12/00* (2006.01)

(52) U.S. Cl. .......................................... 718/1; 711/153
(58) Field of Classification Search ................ 718/100, 718/1; 711/153
See application file for complete search history.

(56) References Cited

U.S. PATENT DOCUMENTS 4,812,967 A 3/1989 Hirosawa et al.
4,835,685 A 5/1989 Kun (Continued)

FOREIGN PATENT DOCUMENTS

JP 63-036445 2/1988

(Continued)

OTHER PUBLICATIONS

IBM TDB vol. 37 No. 06A Jun. 1994 "Shared Memory Cluster—A Scalable Multiprocessor Design" pp. 503-507 IBM TDB vol. 35 No. 18 Jun. 1992 "Logically Shared Memory" pp. 44-49.

(Continued)

*Primary Examiner*—Meng-Al T. An
*Assistant Examiner*—Camquy Truong
(74) *Attorney, Agent, or Firm*—Arthur J. Samodovitz

(57) ABSTRACT

A technique to collectively manage locks by multiple virtual machines and then access shared data protected by the locks. A computer system defines first and second virtual machines and a memory shared by the first and second virtual machines. A lock structure is defined in the shared memory. The lock structure is capable of listing a holder of a lock for shared data in the shared memory. The first virtual machine acquires a lock for the shared data when available by manipulation of the lock structure. After acquiring the lock, the first virtual machine accesses the shared data. The lock structure and the shared data are directly accessible by the first virtual machine. The second virtual machine acquires a lock for the shared data when available by manipulation of the lock structure. After acquiring the lock, the second virtual machine accesses the shared data. The lock structure and shared data are directly accessible by the second virtual machine. In an alternate embodiment of the present invention, the shared data resides in one of the virtual machines while the lock structure remains in shared memory.

21 Claims, 6 Drawing Sheets

U.S. PATENT DOCUMENTS

| | | | |
|---|---|---|---|
| 5,446,841 A | 8/1995 | Kitano et al. | |
| 5,592,625 A | 1/1997 | Sandberg | 395/200.08 |
| 5,692,192 A | 11/1997 | Sudo | 395/675 |
| 5,794,044 A * | 8/1998 | Yellin | 717/139 |
| 5,884,077 A | 3/1999 | Suzuki | 395/675 |
| 5,953,538 A | 9/1999 | Duncan et al. | |
| 6,003,066 A | 12/1999 | Ryan et al. | 709/201 |
| 6,075,938 A | 6/2000 | Bugnion et al. | 395/500.48 |
| 6,081,833 A | 6/2000 | Okamoto | 709/213 |
| 6,115,779 A | 9/2000 | Haubursin et al. | |
| 6,148,378 A | 11/2000 | Bordaz | 711/147 |
| 6,154,832 A | 11/2000 | Maupin | |
| 6,170,045 B1 | 1/2001 | Bobak et al. | 711/169 |
| 6,205,528 B1 | 3/2001 | Kingsbury | 711/170 |
| 6,223,200 B1 | 4/2001 | Barnes et al. | |
| 6,314,501 B1 * | 11/2001 | Gulick et al. | 711/153 |
| 6,332,180 B1 | 12/2001 | Kauffman et al. | |
| 6,347,341 B1 | 2/2002 | Glassen et al. | |
| 6,389,482 B1 | 5/2002 | Bobak et al. | 709/312 |
| 6,397,350 B1 | 5/2002 | Baskey et al. | |
| 6,438,663 B1 | 8/2002 | Agarwal et al. | 711/148 |
| 6,477,560 B1 | 11/2002 | Murayama et al. | 709/104 |
| 6,542,926 B2 | 4/2003 | Zalewski et al. | 709/213 |
| 6,738,977 B1 | 5/2004 | Berry et al. | 719/332 |
| 7,035,870 B2 * | 4/2006 | McGuire et al. | 707/103 R |
| 7,131,120 B2 * | 10/2006 | Veselov | 717/164 |
| 7,181,744 B2 | 2/2007 | Shultz et al. | |
| 2002/0062401 A1 | 5/2002 | Auslander et al. | |
| 2003/0037178 A1 * | 2/2003 | Vessey et al. | 709/319 |
| 2007/0067775 A1 | 3/2007 | Shultz et al. | |

FOREIGN PATENT DOCUMENTS

| | | |
|---|---|---|
| JP | 2112055 A | 4/1990 |
| JP | 07-013823 | 1/1995 |
| JP | 09-319653 | 12/1997 |
| JP | 2002-073358 | 3/2002 |
| WO | WO 00/73902 A1 | 7/2000 |

OTHER PUBLICATIONS

U.S. Appl. No. 10/280,987 entitled "System and Method for Transferring Data Between Virtual Machines or Other Computer Entities" filed on Oct. 24, 2002 by Shultz and Tkatschow USPatent Application END9-2003-0003 entitled "Management of Dispatch Functions in a Virtual Machine Environment". by .M. Donovan,M. Howland S. Shultz & X. Tkatschow.

US Patent Application END9-2003-0011 entitled "Management of Virtual Machines to Utilize Shared Resources" by: C. Casey, S. Shultz & X. Tkatschow.

* cited by examiner

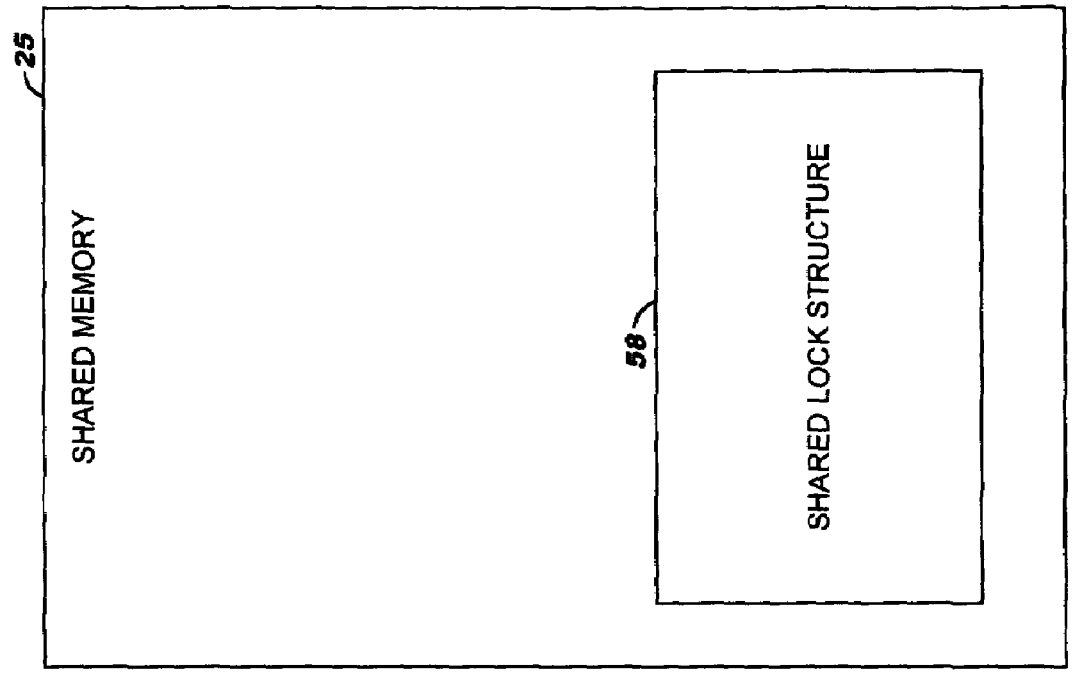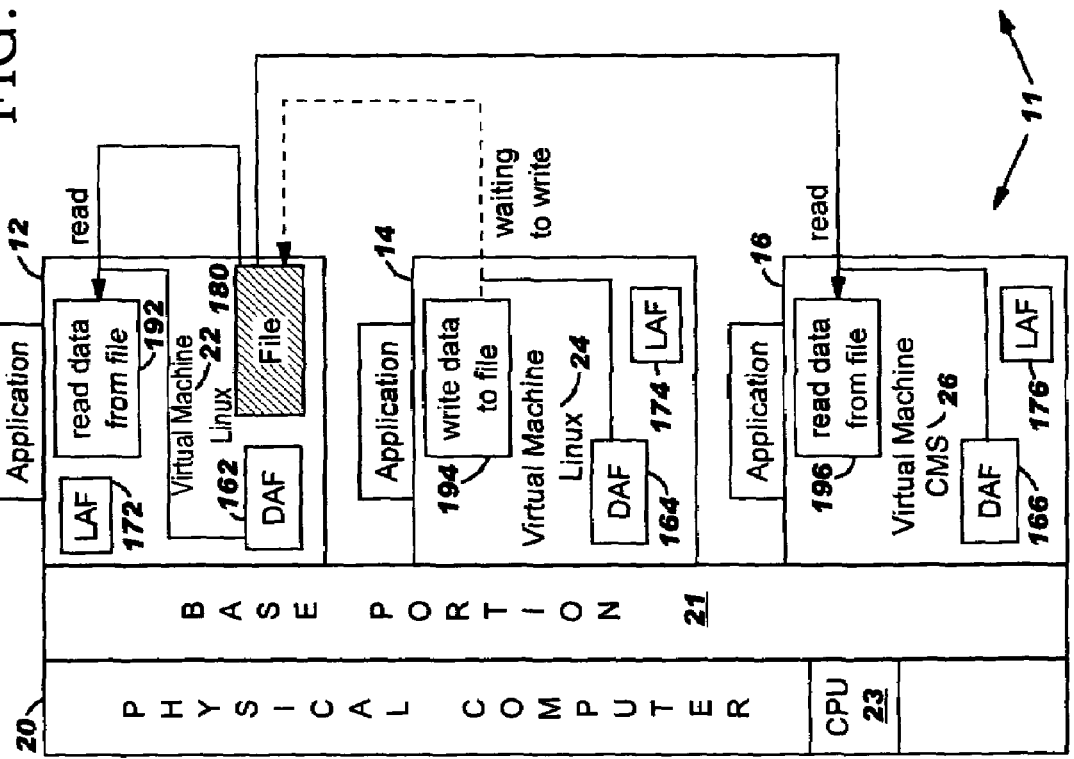
FIG. 4

MANAGEMENT OF LOCKS IN A VIRTUAL MACHINE ENVIRONMENT

This patent application is a continuation-in-part of U.S. patent application entitled "SYSTEM AND METHOD FOR TRANSFERRING DATA BETWEEN VIRTUAL MACHINES OR OTHER COMPUTER ENTITIES, Ser. No. 11/559,936, filed by Steven S. Shultz et al. on Nov. 5, 2006 (now US Publication No. 2007/0067775 A1), which is a division of U.S. patent application entitled "SYSTEM AND METHOD FOR TRANSFERRING DATA BETWEEN VIRTUAL MACHINES OR OTHER COMPUTER ENTITIES", Ser. No. 10/280,987, filed by Steven S. Shutz et al. on Oct. 24, 2002 (now U.S. Pat. No. 7,181,744).

FIELD OF THE INVENTION

The invention relates generally to computer systems, and deals more particularly with management of locks for shared resources in virtual machine operating systems.

BACKGROUND OF THE INVENTION

A virtual machine operating system is well known today, and includes a common base portion and separate user portions formed by the common base portion. In an IBM z/VM operating system, the common base portion is called the "Control Program" or "CP" and each user portion is called a "virtual machine" or "guest". A virtual machine or guest is a virtual sharing/partitioning of real resources such as real memory, CPU and I/O. A guest operating system executes/runs on each virtual machine, and one or more applications run on the guest operating system. Each application and guest operating system behave as if they are running on their own private, real computer.

In some computing environments, resources are shared amongst multiple programs. Shared resources consist of shared data (including shared files and shared directories) and shared processing routines. For example, in IBM VM/370 shared data was stored in shared memory accessible by multiple virtual machines. Also, in IBM VM/CMS, some portions of memory private to the virtual machine are shared among multiple programs in the same virtual machine. VM/CMS uses private locks to determine when access to the shared memory can be parallel and when such access must be sequential. Also in VM/CMS, there are processing routines private to the virtual machine which all programs in the same virtual machine use to access external storage mediums. VM/CMS uses private locks to determine when shared processing routines can be executed in parallel and when such routines must be executed sequentially. While VM/CMS is effective in sharing resources, it is limited to sharing resources within a single virtual machine.

In IBM VM/SP6 operating system and subsequent releases of IBM VM/ESA and z/VM operating systems, data to be shared amongst multiple virtual machines (with a common base portion) resides in private memory of one server virtual machine. Likewise, a lock management structure resides in the server virtual machine. This data is shared by multiple virtual machines by requiring all virtual machines to communicate with the server virtual machine to request access to the shared data. Such communication is in the form of TCP/IP, IUCV or Guest LAN messages (described below), which are high overhead. The server virtual machine then uses its private locks to arbitrate access to the shared data. A similar arrangement is used to arbitrate the use of shared processing routines. While the foregoing arrangement provide access by multiple virtual machines to shared resources, it requires a high overhead communication protocol between the requesting virtual machines and the server virtual machine.

Accordingly, a general object of the present invention is to provide functionality in a virtual machine operating system which effectively and efficiently provides access for multiple virtual machines to shared resources.

Another object of the present invention is to provide functionality in a virtual machine operating system which effectively and efficiently manages locks for multiple virtual machines to shared resources in shared memory of a virtual machine operating system.

Another object of the present invention is to provide functionality in a virtual machine operating system which effectively and efficiently manages locks for shared resources in private memory of a virtual machine.

Another object of the present invention is to provide functionality data in a virtual machine operating system of the foregoing type which minimizes overhead required to manage locks for shared resources.

SUMMARY OF THE INVENTION

The invention resides in a technique to collectively manage locks by multiple virtual machines and then access shared data protected by the locks. A computer system defines first and second virtual machines and a memory shared by the first and second virtual machines. A lock structure is defined in the shared memory. The lock structure is capable of listing a holder of a lock for shared data in the shared memory. The first virtual machine acquires a lock for the shared data when available by manipulation of the lock structure. After acquiring the lock, the first virtual machine accesses the shared data. The lock structure and the shared data are directly accessible by the first virtual machine. The second virtual machine acquires a lock for the shared data when available by manipulation of the lock structure. After acquiring the lock, the second virtual machine accesses the shared data. The lock structure and shared data are directly accessible by the second virtual machine.

According to another embodiment of the present invention, a computer system defines first and second virtual machines, a memory shared by the first and second virtual machines, and a memory private to the first virtual machine. A lock structure resides in the shared memory. The lock structure is capable of listing a holder of a lock pertaining to shared data in the private memory. The first virtual machine includes a first program function to acquire a lock pertaining to the shared data when available by manipulation of the lock structure. The first virtual machine also includes a second program function active after the first virtual machine acquires the lock, to access the shared data. The lock structure is directly accessible by the first program function, and the shared data is directly accessible by the second program function. The second virtual machine includes a third program function to acquire a lock pertaining to the shared data when available by manipulation of the lock structure. The second virtual machine also includes a fourth program function active after the second virtual machine acquires the lock, to request from the first virtual machine access to the shared data. The lock structure is directly accessible by the third program function. The shared data is not directly accessible by the fourth program function.

BRIEF DESCRIPTION OF THE FIGURES

FIG. 4 is a block diagram of a computer system including a virtual machine operating system with data access functions according to a second embodiment of the present invention.

DETAILED DESCRIPTION OF THE PREFERRED EMBODIMENTS

Figure 1:
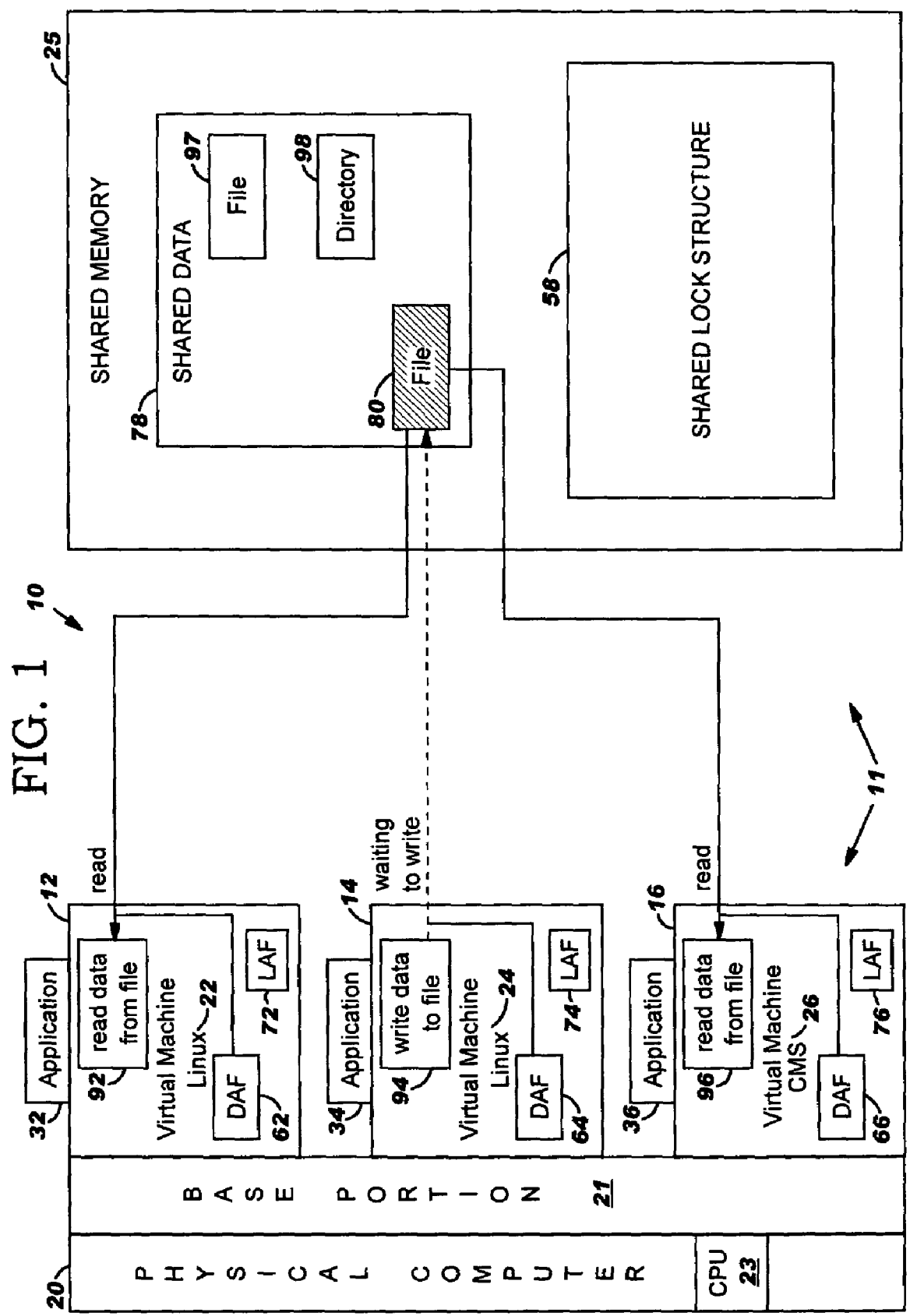
FIG. 1 is a block diagram of a computer system including a virtual machine operating system with data access functions according to a first embodiment of the present invention.

Referring now to the drawings in detail wherein like reference numbers indicate like elements throughout, FIG. 1 illustrates a computer system generally designated 10 according to a first embodiment of the present invention. Computer system 10 includes a physical computer 20 (which includes a CPU 23) and a virtual machine operating system 11. By way of example, the virtual machine operating system can be IBM z/VM version 4.2.0 or 4.3.0 modified to include the present invention. The details of z/VM 4.2.0 are disclosed in IBM publication "z/VM 4.2.0 General Information" (Document Number: GC24-5991-03) which is available from International Business Machines Corp. at PO Box 29570, IBM Publications, Raleigh, N.C. 27626-0570 or on the WWW at www.IBM.com/shop/publications/order. This publication is hereby incorporated by reference as part of the present disclosure. Operating system 11 executes in the physical computer 10 such as an IBM zSeries mainframe although the present invention can be implemented in other server computers or personal computers as well. Operating system 11 includes a common base portion 21 (called "CP" in the z/VM operating system). Common base portion 21 logically partitions the resources (including the CPU and memory) of the physical computer to form user portions 12, 14 and 16 (called "virtual machines" or "guests virtual machines" in the z/VM operating system). The common base portion also performs functions such as virtualizing memory, virtualizing devices and virtualizing CPUs. Guest operating systems 22, 24 and 26 execute on user portions 12, 14 and 16, respectively, and applications 32, 34 and 36 execute on guest operating systems 22, 24 and 26 respectively. There may be multiple applications executing on each operating system. By way of example, guest operating systems 22 and 24 are the Linux (™ of Linus Torvalds) operating system, and guest operating system 26 is an IBM CMS operating system. Other guest operating systems executing on user portions are also feasible such as Microsoft Windows™ operating system, Unix™ operating system, Sun Microsystems Solaris™ operating system or Hewlett Packard HP UX operating system. By way of example, applications 32, 34 and 36 can be IBM DB2 data base management application, IBM WebSphere application, communications applications, etc. The nature of applications 32, 34 and 36 form no part of the present invention, except that they may request access to shared data.

Each virtual machine has its own private memory for its private data, applications and operating system functions such as Data Access Functions 62, 64 and 66 ("DAFs") and Lock Access Functions ("LAFs") 72, 74 and 76 in virtual machines 12, 14 and 16, respectively. Consequently, each virtual machine is afforded a measure of privacy from the other virtual machines as in separate physical computers. The logical partition between virtual machines is also provided by the allocation of a virtual CPU and other virtual devices to each virtual machine. A "virtual CPU" is a portion of the real CPU(s) that appears to the guest operating system as its own CPU. Computer 10 also includes a memory area 25 which is shared by all of the virtual machines 12, 14 and 16. Being "shared" each virtual machine can directly access the shared memory 25 and the data and data structures stored in the shared memory by appropriate address. In accordance with the present invention, shared data 78 including shared files 80 and 97 and shared directory 98 are located in shared memory (even though the DAFs and LAFs are located in the private memory of the respective virtual machines). Consequently, each DAF can access the shared files and shared directory to read data therefrom and write data thereto. As explained in more detail below, each DAF manages access to the shared data 78 in shared memory 25. A shared lock structure 58, described in more detail below, also resides in shared memory 25. Consequently, each LAF can also access the shared lock structure 58. Each LAF manages the shared lock structure to obtain or release a lock for the shared data. Each DAF 62, 62 and 66 and LAF 72, 74 and 76 provide access to the shared data and manage the corresponding locks pursuant to read and write requests made by their respective application 32, 34 and 36 and their respective operating system 22, 24 and 26.

In the state illustrated in FIG. 1, virtual machines 12 and 16 are concurrently reading data from shared file 80, and virtual machine 14 is waiting to write to shared file 80. As explained below, virtual machine 14 cannot write to shared file 80 until virtual machines 12 or 16 conclude their access to the shared file 80, because a writing operation would alter the data being read by virtual machines 12 and 16. In the case of virtual machine 12, the read request 92 originated from application 32 which passed it to operating system 22 for execution. Likewise, in the case of virtual machine 16, the read request 94 originated from application 36 which passed it to operating system 26 for execution. In the case of virtual machine 14, the write request originated from operating system 24. However, the source of the read and write request within each virtual machine is not important to the present invention.

Figure 2:
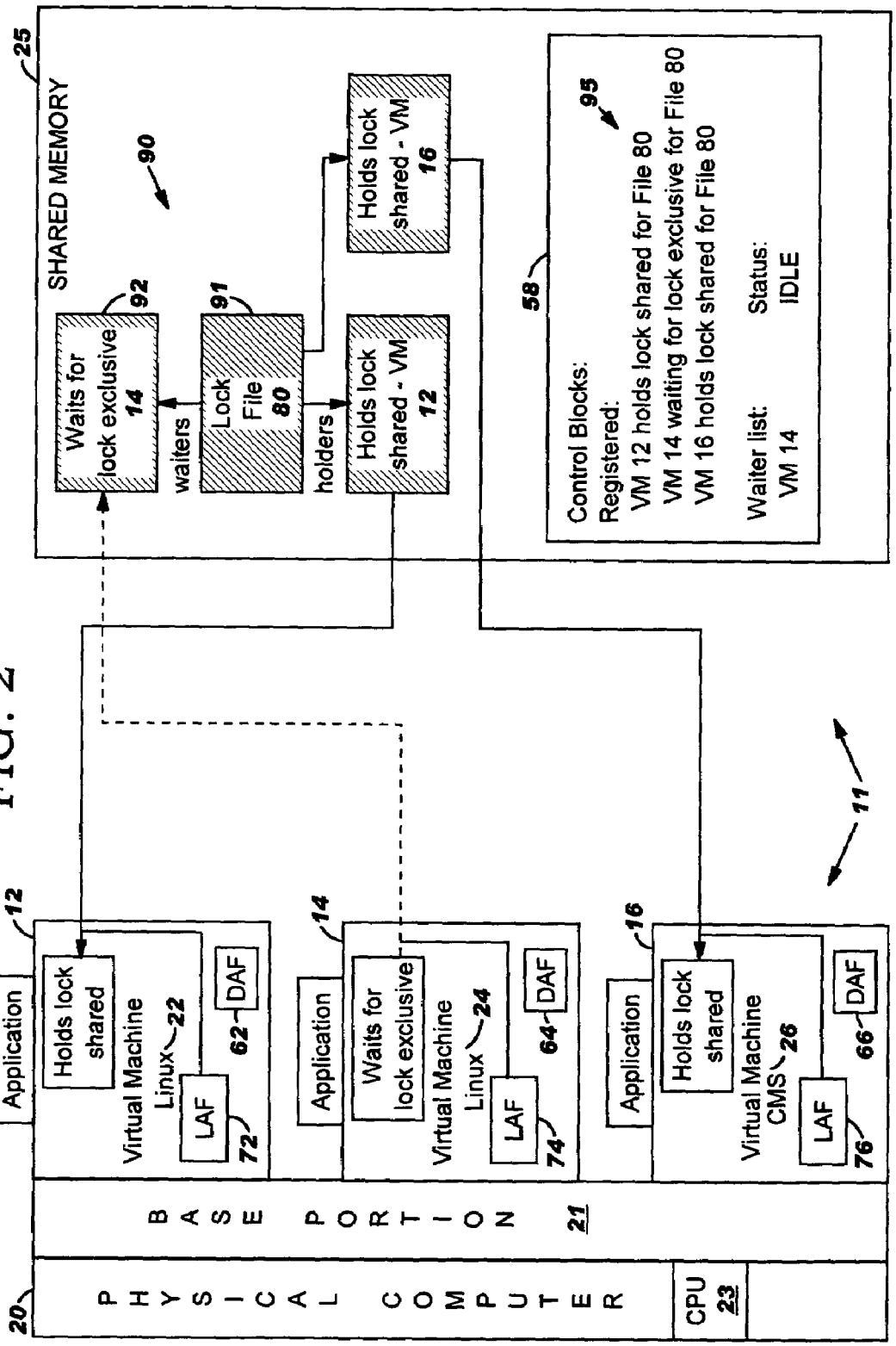
FIG. 2 is a block diagram of the computer system of FIG. 1 including the virtual machine operating system with lock access functions according to the first embodiment of the present invention.

FIG. 2 illustrates the lock structure or control block 58 within the shared memory 25 of computer system 10 in more detail. FIG. 2 also illustrates figuratively by lock chain 90 and associated arrows to the virtual machines, the effect of the lock structure 58. Virtual machines 12 and 16 concurrently hold a shared lock 91 for shared file 80. Virtual machine 14 has a place holder 92 waiting on virtual machines 12 and 16 for an exclusive lock to shared file 80. This is actually recorded in lock structure or control block 58 which indicates that virtual machines 12 and 16 concurrently hold a shared lock for shared file 80 and virtual machine 14 is waiting on virtual machines 12 and 16 for an exclusive lock for shared file 80. The "waiter list" 95 of control block 58 indicates the foregoing ownership of the lock, order of the waiter(s), and the nature of each lock, i.e. virtual machines 12 and 16 currently hold lock 91 in a shared manner, and virtual machine 14 is currently waiting for the lock in an exclusive manner. In the illustrated embodiment, there are additional, separate lock structures or control blocks 59 and 61 for file 97 and directory 98, respectively. Each of the control blocks 59 and 61 is similar in principle/structure as control block 58, although the respective states of control blocks 59 and 61 depend on the dynamics of the virtual machines, i.e. which virtual machine, if any, currently holds the lock for file 97 and which virtual machines, if any, are currently waiting for the lock for file 97, and which virtual machine, if any, currently holds the lock for directory 98 and which virtual machines, if any, are currently waiting for the lock for directory 98. With a separate lock, the virtual machines can concurrently access files 80 and 97 and directory 98, regardless of the nature, exclusive or shared, of the lock held by each virtual machine to the other files or directory. For example, if virtual machine 12 has an exclusive lock for file 80, virtual machine 14 can concurrently have an exclusive lock for file 97 and virtual machine 16 can concurrently have an exclusive lock for directory 98. Other shared data structures with their respective locks can likewise be included in shared memory 25.

Figure 3:
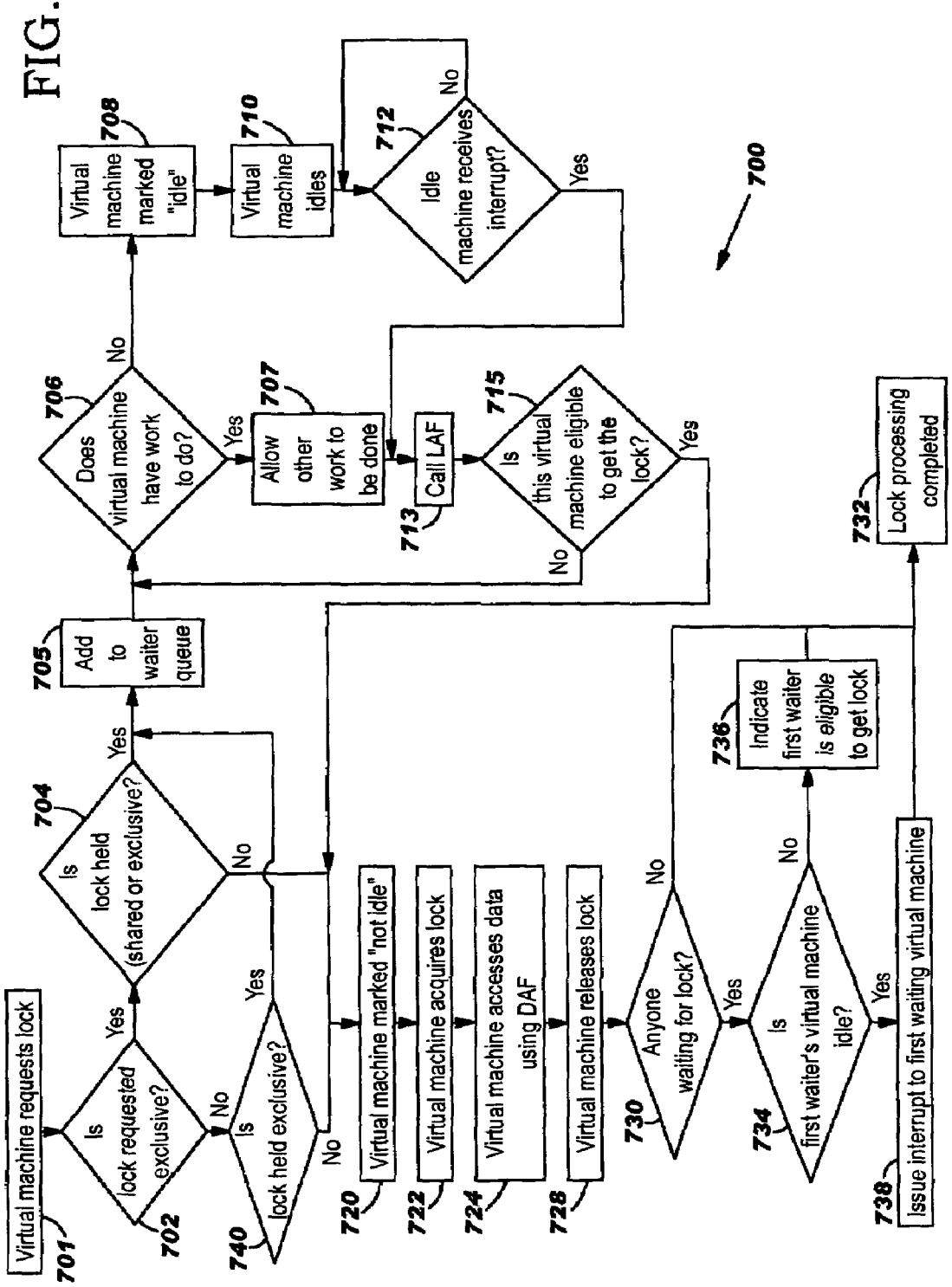
FIG. 3 is a flow chart illustrating the lock management function, data access function and other functions within the computer system of FIGS. 1 and 2.

FIG. 3 illustrates operation 700 of each LAF, DAF and other functions within the virtual machine that is trying to obtain the lock for and then access a shared file, directory or other data structure in shared memory. In the following example, a virtual machine requests a lock for a shared file (step 701). If the virtual machine just wants to read the shared file, then the virtual machine need only request a shared lock. However, if the virtual machine wants to write to the shared file, then the virtual machine will request an exclusive lock. If the request is for an exclusive lock, then decision 702 leads to decision 704. In decision 704, the LAF determines if the requested lock is currently held by another virtual machine (either in a shared or exclusive manner). If so, the exclusive lock is not available to the current requester, and the LAF updates the control block 58 to indicate that the requesting virtual machine is on the "waiter list" and is registered on the wait queue (step 705). Next, the LAF determines if its virtual machine has other work to do (decision 706). If not, then the LAF makes an entry in control block 58 under the category of "status" to indicate that the requesting virtual machine is "idle" (step 708). Then, the LAF causes the requesting virtual machine to enter into the "idle/quiescent" state after making an entry in another control block that this virtual machine is programmed to read when it awakens (step 710). Then, the requesting virtual machine waits for an interrupt (decision 712), at which point it will awaken and read the other control block. This other control block notifies the virtual machine to invoke its LAF (step 713). Referring again to decision 706, if the requesting virtual machine (that cannot get the lock now) has other work to do, the LAF will return control to the guest operating system or application to perform that other work (step 707). Afterwards, the guest operating system will call the LAF (step 713).

When the LAF is called in step 713 via either decision 712 or step 707, the LAF will read control block 58 to determine if its virtual machine is eligible to hold the lock, i.e. if the requested lock is exclusive, that no other virtual machine currently holds the lock, or if the requested lock is shared, that no other virtual machine currently holds the lock in an exclusive manner (decision 715). If the virtual machine is not eligible to hold the lock, then the LAF returns to decision 706 to continue processing as described above. However, if the virtual machine is now eligible to hold the lock, then the LAF acquires the lock (step 722). The acquisition of the lock is accomplished by corresponding update to control block 58, i.e. indication that the requesting virtual machine now holds the lock and is not a waiter. Next, the LAF invokes the DAF of the requesting virtual machine to directly access the shared data by appropriate address to either read from or write to the data in shared memory 25 (step 724). Afterwards, the DAF notifies the LAF that the virtual machine has completed its access to the shared data and the LAF "releases" the lock (step 728). In response, the LAF updates the control block 58 to indicate that the requesting virtual machine no longer holds the lock. Also, the LAF determines from the control block 58 if any other virtual machine is currently waiting for the lock (decision 730). If not, the processing of the LAF is complete and control is returned to the guest operating system or application of the LAF's virtual machine (step 732). If so, the LAF determines from the control block 58 if the first virtual machine marked "waiting" is "idle" (decision 734). If not, the LAF makes an entry in another control block that the non idle, waiting virtual machine will check when it completes its current work item (step 736). This entry will notify the waiting virtual machine (step 713) to invoke its LAF to attempt to acquire the lock at step 722. Then, processing is complete for the LAF (step 732) because it would be too disruptive to the non idle, waiting virtual machine to be interrupted at this time. Referring again to decision 734, if the waiting virtual machine is idle, then the LAF makes the entry in the other control block to invoke the LAF of the waiting virtual machine when interrupted, and issues an interrupt to the waiting virtual machine (step 738). This will not be disruptive to the waiting virtual machine because it is idle anyway. Then, the LAF of the requesting virtual machine completes its processing and returns control to the operating system or application of its own virtual machine (step 732). After receiving the interrupt, the idle, waiting virtual machine (step 712) will awaken and can acquire the lock at step 722.

Referring again to decision 704, if the requested lock is not currently held by anyone, then the LAF marks the requesting virtual machine as "not idle" in the "status" category of control block 58 (step 720) and grants the lock to the requesting virtual machine (step 722). The LAF continues processing as described above. Referring again to decision 702, if the lock requested by the virtual machine is shared, such as to read the shared file 80, then the LAF determines if the lock is currently being held in an exclusive manner (decision 740). If not (i.e. no lock is currently being held or only a shared lock is currently being held), then the LAF proceeds to step 720 and continues processing as described above. However, if the lock is currently held in an exclusive manner by another virtual machine, then the LAF proceeds to step 705 to add the requesting virtual machine to the waiter list, and then continues as described above.

Figure 5:
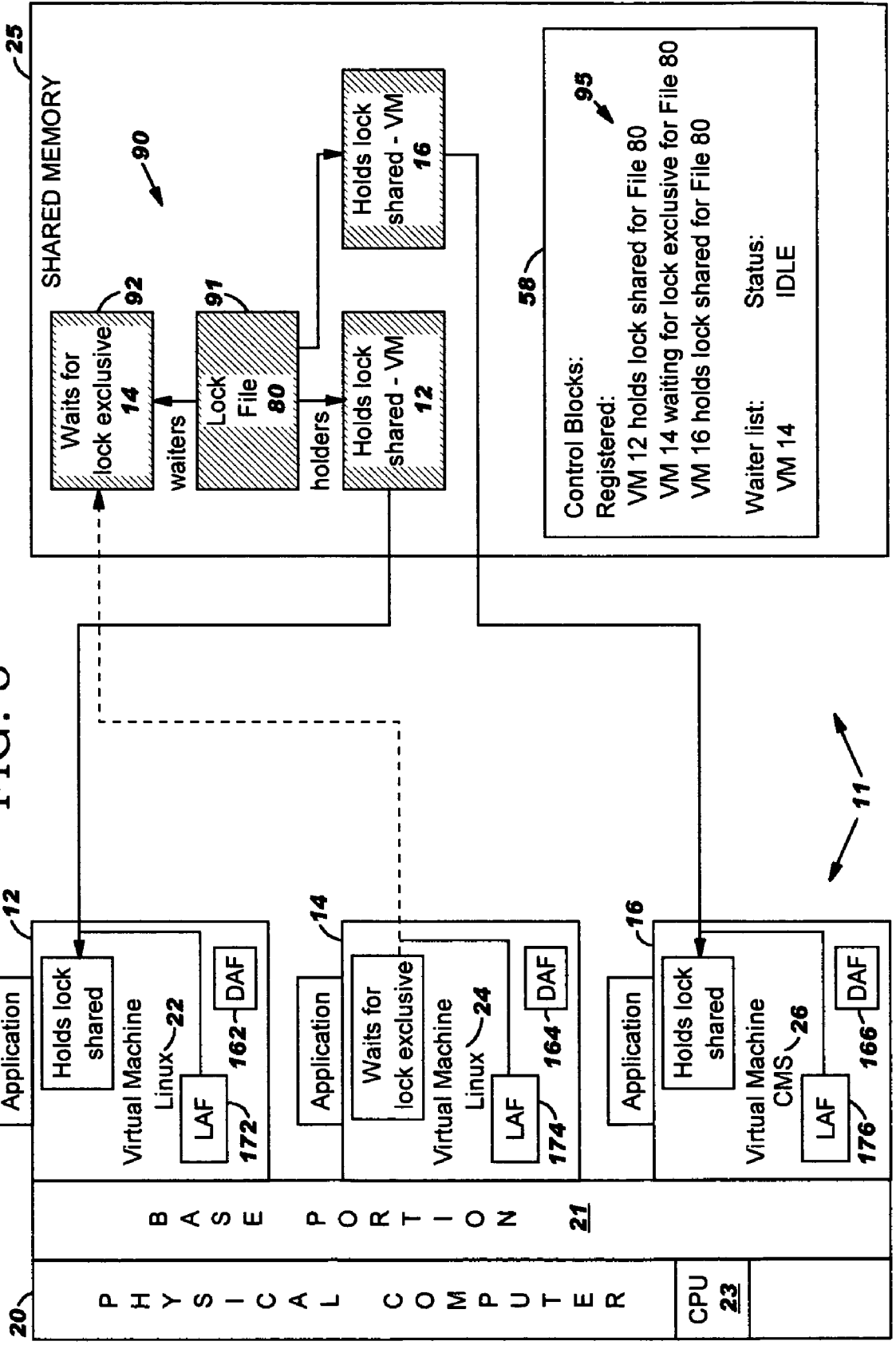
FIG. 5 is a block diagram of the computer system of FIG. 4 including the virtual machine operating system with lock access functions according to the second embodiment of the present invention.

FIGS. 4 and 5 illustrate computer system 110 according to a second embodiment of the present invention. System 110 is similar to system 10 except that in system 110 a shared file 180 resides in private memory of virtual machine 12. In system 10, shared file 80 resides in shared memory 25. Also, there are corresponding changes to DAFs 162, 164 and 166 as described below to access the shared file in the private memory of virtual machine 12 in system 110 (instead of from the shared memory 25 as in system 10). Both systems 10 and 110 have the same lock structure 58 in the shared memory 25. LAFs 172, 174 and 176 of system 110 (like LAFs 72, 74 and 76 of system 10) can directly access the lock structure 58 from shared memory by appropriate address. The LAFs 172, 174 and 176 differ from the LAFs 72, 74 and 76 in that the LAFs 172, 174 and 176 control the lock for the DAFs 162, 164 and 166, whereas the LAFs 72, 74 and 76 control the lock for the shared data. The reason for this difference is that an appreciable time may be required for the DAFs 162, 164 and 166 to access the shared data, more so than the time of actually accessing the shared data and conflict should be avoided during the entire operation of the DAFs 162, 164 and 166. In contrast, when the shared data resides in shared memory as in the case of system 10, the actual access of the shared data is much faster.

Figure 6:
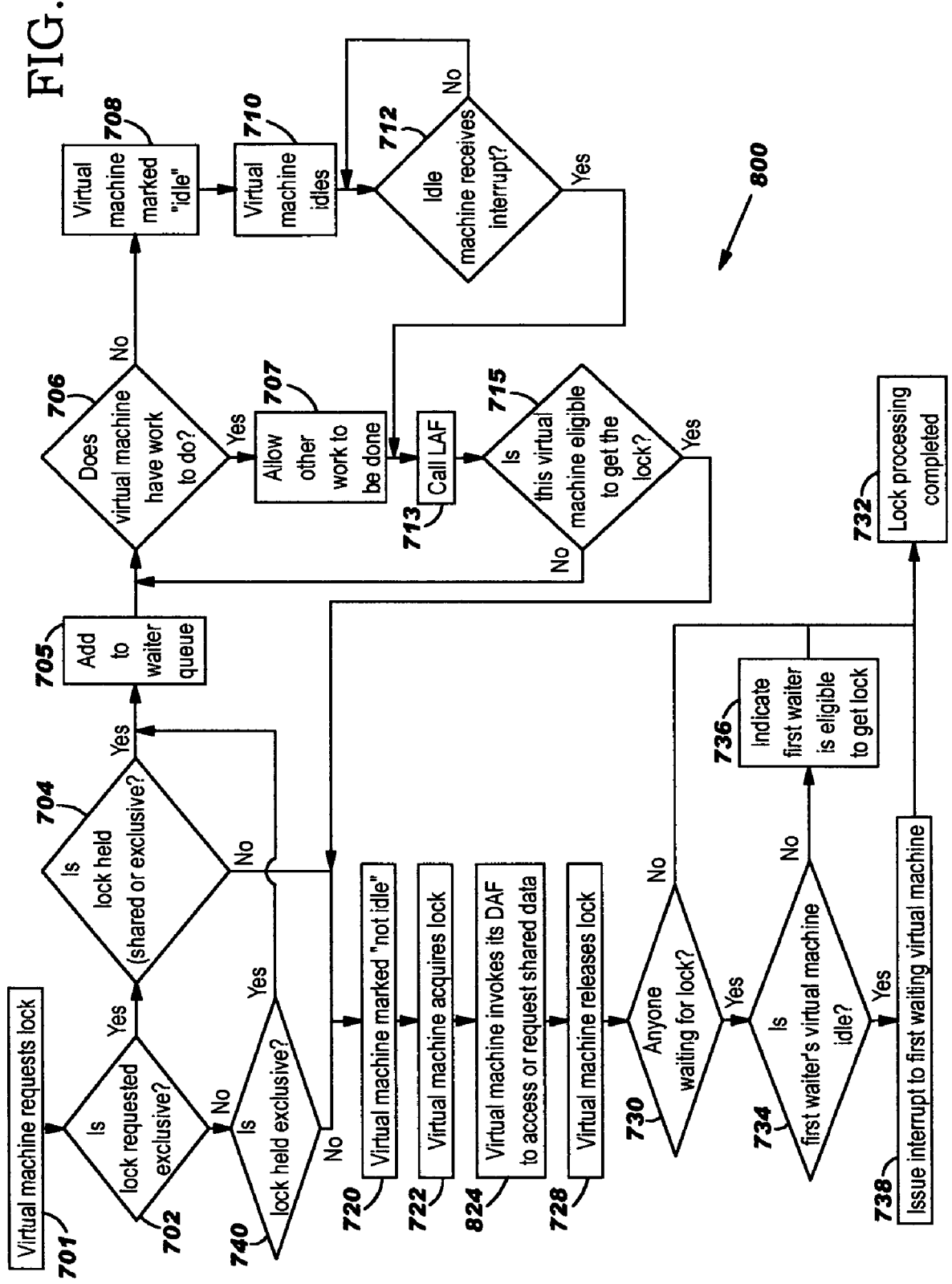
FIG. 6 is a flow chart illustrating the lock management function, data access function and other functions within the computer system of FIGS. 4 and 5.

FIG. 6 illustrates operation 800 of each LAF 172, 174 and 176, DAF 162, 164 and 166 and other functions within each of the virtual machines 12, 14 and 16, respectively, of system 110 that are trying to obtain the lock for a shared file, directory or other data structure in private memory of virtual machine 12.

As noted above, LAFs 172, 174 and 176 are similar to LAFs 72, 74 and 76 except for what is being locked. In system 10, LAFs 72, 74 and 76 lock the shared data whereas in system 110, LAFs 172, 174 and 176 lock the DAFs 162, 164 and 166. Thus, DAF 162 cannot operate to access data from shared data 180 in its own private memory without LAF 172 first obtaining the lock. DAF 164 cannot operate to request the shared data 180 from virtual machine 12 without LAF 174 first obtaining the lock. Likewise, DAF 166 cannot operate to request the shared data 180 from virtual machine 12 without LAF 176 first obtaining the lock.

Also, as noted above, DAFs 162, 164 and 166 are similar to DAFs 62, 64 and 66 except for the manner of accessing the shared data. This was step 724 in function 700 and is step 824 in function 800. As explained above, in step 724, all of the requesting virtual machines access the shared data directly from shared memory with an appropriate address. However, in system 110, the shared data does not reside in shared memory, but instead resides in virtual machine 12. So, if virtual machine 12 holds the lock and is requesting access to the shared data in virtual machine 12, the DAF 162 directly accesses the data using the appropriate address. However, if virtual machine 14 or 16 holds the lock and is requesting access to the shared data in virtual machine 12, DAF 164 or 166 cannot access the shared directly. Instead, DAF 164 or 166 sends an inter-virtual machine message request to virtual machine 12 to access the data. This inter-virtual machine message can be made using known TCP/IP, IUCV or Guest LAN communication protocols. TCP/IP is an industry standard and therefore, need not be explained herein. "IUCV" is a proprietary protocol of IBM zSeries servers and comprises the following steps. A message is written into the requesters private memory. Than, an interrupt is sent to the virtual machine 12 via the common base portion. The common base portion writes the message to virtual machine 12's private memory. The interrupt invokes an interrupt handler in virtual machine 12 to read the message and forward it to the proper function in virtual machine 12 for handling. This function within virtual machine 12 receives the message (that originated from DAF 164 or 166), and fetches the data at the specified address in the case of a read request and writes to the specified address in the case of a write request. Then, the function within virtual machine 12, using IUCV, returns the data in the case of a read request or returns an acknowledgment in the case of a write request, both using an inter-virtual machine message. After such return, the respective LAF 174 or 176 releases the lock. As noted above, Guest LAN can be used instead of IUCV. Guest LAN is a virtualized communication device using LAN protocol. LAN protocol allows communication between a sender and multiple receivers simultaneously. To communicate via a Guest LAN, both sender and receiver(s) invoke the common base portion indicating that they wish to participate in Guest LAN. To send data, the sender invokes the common base portion indicating the data to be sent and which receiver(s) should get the data. The common base portion generates an interrupt for each identified receiver. Each such receiver responds by invoking the common base portion to receive the data. The common base portion then copies the data from the sender's private memory to the private memory of each of the receivers. Once all receivers have received the data, the common base portion generates an interrupt to the sender indicating that the data has been transferred to all receivers.

Based on the foregoing, a computer system embodying the present invention has been disclosed. However, numerous modifications and substitutions can be made without deviating from the scope of the present invention. For example, logical partitions could be substituted for the virtual machines. Also, if desired, LAFs 172, 174 and 176 can obtain locks for the shared data 180 instead of for the DAFs 162, 164 or 166. Therefore, the present invention has been disclosed by way of illustration and not limitation, and reference should be made to the following claims to determine the scope of the present invention.

The invention claimed is:

1. A computer system for managing a lock, said computer system having a central processor unit and a memory both shared by first and second virtual machines, said computer system comprising:

a first program function, executing within said first virtual machine, to acquire an available lock for shared data in said shared memory for said first virtual machine or a second program function executing within said first virtual machine by updating a lock structure in said shared memory, said lock structure listing said first virtual machine or said second program function as a holder of said lock and also listing said second virtual machine or a third program function, executing in said second virtual machine, as waiting for said lock and whether said second virtual machine is idle;

responsive to said second program function requesting to release said lock, said first program function reading said lock structure to determine said second virtual machine or said third program function as waiting for said lock and whether said second virtual machine is idle, and if said second virtual machine is idle, said first virtual machine or said first program function sending an interrupt to said second virtual machine, and in response, a fourth program function, executing in said second virtual machine, reading said lock structure to determine that said lock is available and said second virtual machine or said third program function is waiting for said lock, and in response, said fourth program function acquiring said lock for said second virtual machine or said third program function by updating said lock structure, and if said second virtual machine is not idle, said first virtual machine not sending an interrupt to said second virtual machine to alert said second virtual machine of availability of said lock, and subsequently, said fourth program function, responsive to said third program function completing a work item that did not require said lock and without an interrupt being sent to said second virtual machine, reading said lock structure to determine that said lock is available and said second virtual machine or said third program function is waiting for said lock, and in response, acquiring the available lock for said second virtual machine or said third program function by updating said lock structure.

2. A computer system as set forth in claim 1 wherein said lock structure is directly accessible by said first program function and said fourth program function, and said shared data is directly accessible by said second program function and said third program function.

3. A computer system as set forth in claim 1 wherein said second program function accesses said shared data while said first virtual machine or said second program function holds said lock, and said third program function accesses said shared data while said second virtual machine or said third program function holds said lock.

4. A computer system as set forth in claim 1 wherein:
said first and second program functions reside in a memory private to said first virtual machine, and said second virtual machine cannot access said first or second program functions; and
said third and fourth program functions reside in a memory private to said second virtual machine, and said first virtual machine cannot access said third or fourth program functions.

5. A computer system as set forth in claim 1 wherein said shared data is a shared file, and said lock structure is separate from said shared file.

6. A computer system as set forth in claim 1 wherein said shared data is a shared directory, and said lock structure is separate from said shared directory.

7. A computer system as set forth in claim 1 wherein responsive to said second program function requesting to release said lock and said first program function reading said lock structure to determine said second virtual machine or said third program function as waiting for said lock and that said second virtual machine is not idle, said computer system not sending an interrupt or any message to said second virtual machine to alert said second virtual machine of availability of said lock, and subsequently, said fourth program function, responsive to said third program function completing a work item that did not require said lock and without an interrupt or said other message being sent to said second virtual machine, reading said lock structure to determine that said lock is available and said second virtual machine or said third program function is waiting for said lock, and in response, acquiring the available lock for said second virtual machine or said third program function by updating said lock structure.

8. A computer program product for managing a lock in a computer system having a central processor unit and a memory both shared by first and second virtual machines, said computer program product comprising:
a computer readable media;
a first program function, for execution within said first virtual machine, to acquire an available lock for shared data in said shared memory for said first virtual machine or a second program function executing within said first virtual machine by updating a lock structure in said shared memory, said lock structure listing said first virtual machine or said second program function as a holder of said lock and also listing said second virtual machine or a third program function, executing in said second virtual machine, as waiting for said lock and whether said second virtual machine is idle, said first program function being responsive to said second program function requesting to release said lock, by reading said lock structure to determine said second virtual machine or said third program function as waiting for said lock and whether said second virtual machine is idle, and
if said second virtual machine is idle, said first virtual machine or said first program function sending an interrupt to said second virtual machine, and in response, a fourth program function, executing in said second virtual machine, reading said lock structure to determine that said lock is available and said second virtual machine or said third program function is waiting for said lock, and in response, said fourth program function acquiring said lock for said second virtual machine or said third program function by updating said lock structure, and
if said second virtual machine is not idle, said first virtual machine not sending an interrupt to said second virtual machine to alert said second virtual machine of availability of said lock, said fourth program function, responsive to said third program function completing a work item that did not require said lock, reading said lock structure to determine that said lock is available and said second virtual machine or said third program function is waiting for said lock, and in response, acquiring the available lock for said second virtual machine or said third program function by updating said lock structure; and wherein
said first, second, third and fourth program functions are recorded on said media.

9. A computer program product as set forth in claim 8 wherein said lock structure is directly accessible by said first program function and said fourth program function, and said shared data is directly accessible by said second program function and said third program function.

10. A computer program product as set forth in claim 8 wherein said second program function accesses said shared data while said first virtual machine or said second program function holds said lock, and said third program function accesses said shared data while said second virtual machine or said third program function holds said lock.

11. A computer program product as set forth in claim 8 wherein:
said first and second program functions reside in a memory private to said first virtual machine, and said second virtual machine cannot access said first or second program functions; and
said third and fourth program functions reside in a memory private to said second virtual machine, and said first virtual machine cannot access said third or fourth program functions.

12. A computer program product as set forth in claim 8 wherein said shared data is a shared file, and said lock structure is separate from said shared file.

13. A computer program product as set forth in claim 8 wherein said shared data is a shared directory, and said lock structure is separate from said shared directory.

14. A computer program product as set forth in claim 8 wherein said fourth program function is responsive to said third program function completing a work item that did not require said lock and without an interrupt or other message being sent to said second virtual machine to notify said second virtual machine that said lock is available, reading said lock structure to determine that said lock is available and said second virtual machine or said third program function is waiting for said lock, and in response, acquiring the available lock for said second virtual machine or said third program function by updating said lock structure.

15. A method performed in a computer system having a central processor unit and a memory both shared by first and second virtual machines, said method comprising the steps of:
- a first program function, executing within said first virtual machine, acquiring an available lock for shared data in said shared memory for said first virtual machine or a second program function executing within said first virtual machine by updating a lock structure in said shared memory, said lock structure listing said first virtual machine or said second program as a holder of said lock and also listing said second virtual machine or a third program function, executing in said second virtual machine, as waiting for said lock and whether said second virtual machine is idle;
- responsive to said second program function requesting to release said lock, said first program function reading said lock structure to determine said second virtual machine or said third program function as waiting for said lock and whether said second virtual machine is idle, and
  - if said second virtual machine is idle, said first virtual machine or said first program function sending an interrupt to said second virtual machine, and in response, a fourth program function, executing in said second virtual machine, reading said lock structure to determine that said lock is available and said second virtual machine or said third program function is waiting for said lock, and in response, said fourth program function acquiring said lock for said second virtual machine or said third program function by updating said lock structure, and
  - if said second virtual machine is not idle, said first virtual machine not sending an interrupt to said second virtual machine to alert said second virtual machine of availability of said lock, and subsequently, said fourth program function, responsive to said third program function completing a work item that did not require said lock and without an interrupt being sent to said second virtual machine, reading said lock structure to determine that said lock is available and said second virtual machine or said third program function is waiting for said lock, and in response, acquiring the available lock for said second virtual machine or said third program function by updating said lock structure.

16. A method as set forth in claim 15 wherein said lock structure is directly accessible by said first program function and said fourth program function, and said shared data is directly accessible by said second program function and said third program function.

17. A method as set forth in claim 15 wherein said second program function accesses said shared data while said first virtual machine or said second program function holds said lock, and said third program function accesses said shared data while said second virtual machine or said third program function holds said lock.

18. A method as set forth in claim 15 wherein:
- said first and second program functions reside in a memory private to said first virtual machine, and said second virtual machine cannot access said first or second program functions; and
- said third and fourth program functions reside in a memory private to said second virtual machine, and said first virtual machine cannot access said third or fourth program functions.

19. A method as set forth in claim 15 wherein said shared data is a shared file, and said lock structure is separate from said shared file.

20. A method as set forth in claim 15 wherein said shared data is a shared directory, and said lock structure is separate from said shared directory.

21. A method as set forth in claim 15 wherein responsive to said second program function requesting to release said lock and said first program function reading said lock structure to determine said second virtual machine or said third program function as waiting for said lock and that said second virtual machine is not idle, said computer system not sending an interrupt or any message to said second virtual machine to alert said second virtual machine of availability of said lock, and subsequently, said fourth program function, responsive to said third program function completing a work item that did not require said lock and without an interrupt or said other message being sent to said second virtual machine, reading said lock structure to determine that said lock is available and said second virtual machine or said third program function is waiting for said lock, and in response, acquiring the available lock for said second virtual machine or said third program function by updating said lock structure.

* * * * *